United States Patent
Nakane et al.

(10) Patent No.: US 7,776,410 B2
(45) Date of Patent: Aug. 17, 2010

(54) RESIN COMPOSITION FOR EXTRUSION MOLDING AND EXTRUSION-MOLDED ARTICLE

(75) Inventors: Toshio Nakane, Fuji (JP); Mineo Ohtake, Fuji (JP); Toshio Shiwaku, Fuji (JP); Masato Suzuki, Fuji (JP)

(73) Assignee: Polyplastics Co. Ltd., Tokyo (JP)

( * ) Notice: Subject to any disclaimer, the term of this patent is extended or adjusted under 35 U.S.C. 154(b) by 767 days.

(21) Appl. No.: 11/666,174

(22) PCT Filed: Oct. 27, 2005

(86) PCT No.: PCT/JP2005/020162
§ 371 (c)(1),
(2), (4) Date: Apr. 25, 2007

(87) PCT Pub. No.: WO2006/046765
PCT Pub. Date: May 4, 2006

(65) Prior Publication Data
US 2008/0286510 A1  Nov. 20, 2008

(30) Foreign Application Priority Data
Oct. 29, 2004 (JP) ............................. 2004-316884
Jan. 13, 2005 (JP) ............................. 2005-006457

(51) Int. Cl.
 C09K 19/00 (2006.01)
(52) U.S. Cl. .................. 428/1.1; 428/412; 428/474.4; 428/475.2; 428/480; 252/299.01; 252/299.62
(58) Field of Classification Search ............... 428/1.1, 428/412, 474.4, 475.2, 480; 252/299.01, 252/299.62
See application file for complete search history.

(56) References Cited
U.S. PATENT DOCUMENTS
5,891,532 A  4/1999  Furuta et al.

2003/0008979 A1  1/2003  Suenaga et al.

FOREIGN PATENT DOCUMENTS

| JP | 59-71348 | 4/1984 |
| JP | 60-173056 | 9/1985 |
| JP | 61-42565 | 3/1986 |
| JP | 6-263857 | 9/1994 |
| JP | 6-306261 | 11/1994 |
| JP | 8-183910 | 7/1996 |
| JP | 8-301983 | 11/1996 |
| JP | 8-311311 | 11/1996 |
| JP | 9-12744 | 1/1997 |
| JP | 2002-249647 | 9/2002 |

OTHER PUBLICATIONS

International Search Report mailed Dec. 27, 2005 in PCT/JP2005/020162.

*Primary Examiner*—Michael C Miggins
(74) *Attorney, Agent, or Firm*—Nixon & Vanderhye P.C.

(57) ABSTRACT

A purpose of the present invention is to obtain a hollow extruded article by easy blow molding or extrusion molding to give a draw down resistance and a uniform wall thickness of the article without damaging low gas permeability which is a characteristic property of a liquid-crystalline polymer. A resin composition for extrusion molding which is prepared by melting and kneading 99-70 wt. % of wholly aromatic polyester amide liquid crystal resin (A) having a melting point of 270-370° C. and a melt viscosity at 1000/sec. shear rate of 20-60 Pa·s at Temperature T1 which is higher than 20° C. from said melting point, and containing (I) 1-15 mole % of 6-hydroxy-2-naphthoic acid residue, (II) 40-70 mole % of 4-hydroxybenzoic acid residue, (III) 5-28.5 mole % of aromatic diol residue, (IV) 1-20 mole % of 4-aminophenol residue, and (V) 6-29.5 mole % of aromatic dicarboxylic acid residue; and 1-30 wt. % of epoxy modified polyolefin type resin (B), and has a melt viscosity at 1000/sec. shear rate of 60-4000 Pa·s at said Temperature T1, and a melt tensile strength of 20 mN or more at 14.8 m/min. draw rate is used.

7 Claims, No Drawings

RESIN COMPOSITION FOR EXTRUSION MOLDING AND EXTRUSION-MOLDED ARTICLE

This application is the US national phase of international application PCT/JP2005/020162 filed 27 Oct. 2005 which designated the U.S. and claims benefit of JP 2004-316884 and JP 2005-006457, dated 29 Oct. 2004 and 13 Jan. 2005, respectively, the entire content of which is hereby incorporated by reference.

TECHNICAL FIELD

The present invention relates to a resin composition for extrusion molding, containing a specific wholly aromatic polyesteramide liquid crystal resin and an epoxy-modified polyolefin resin, having a specific melt viscosity and a specific melt tension, and an extrusion molded article thereof.

BACKGROUND ARTS

A liquid-crystalline polyester resin, which retains excellent fluidity, mechanical strength, heat resistance, chemical resistance, electric properties and the like in a good balance, is widely used as a high performance engineering plastic, and is mostly used for injection molding.

The liquid-crystalline polyester resin, which has recently often a further advanced and specialized application, is expected to be molded efficiently and economically by blow molding and the like, particularly by extrusion molding to get an article with excellent physical properties of liquid-crystalline polyester retained.

For example, pipes, containers and the like, which is needed to have high mechanical properties in addition to heat resistance to use under a high temperature atmosphere, have conventionally been made of metal materials, but are desired to be made of the liquid-crystalline polyester resin described above by extrusion-molding in order to furnish them with light weight and corrosion resistant at a low cost. However, the liquid-crystalline polyester resin, which is low in melt tension as the most important property for applying to blow molding in spite of excellent fluidity and physical properties, is so remarkably ready at drawdown that it is quite difficult to use for blow molding to get a desired shape of molded article. There have been contemplated various methods to improve, for example, a method using a highly polymerized polyester resin with a high intrinsic viscosity, a method using a branched polyester, and a method for further supplying the polyester resin with various fillers. But any methods give little improvements, and thus are insufficient to use the polyester resin.

For example, JP-A 6-306261 discloses a liquid-crystalline polyester resin composition for blow or extrusion molding which is produced by formulating and melt-kneading (A) 100 parts by weight of an aromatic liquid-crystalline polyester containing a specific construction unit, (B) 0.2-10 parts by weight of a styrene copolymer consisting of 40-97 wt % of styrene, 60-3 wt % of glycidyl ester of $\alpha,\beta$-unsaturated acid and 0-50 wt % of the other vinyl monomer and (C) 0-100 parts by weight of one or more of fibrous, powdery and tabular fillers to improve the melt tension of a liquid crystal resin, thereby to prevent parison drawdown (see claims 1 to 5 of JP-A 6-306261).

However, those different resin components to improve the melt tension cannot be applied to the molded article requiring a strict performance, because they deteriorate performances of the liquid crystalline resin composition such as heat resistance, mechanical strength and gas permeability which are reflected.

JP-A 8-311311 discloses an aromatic polyester composition containing (A) 100 parts by weight of an aromatic polyester, having a melt viscosity of 10 and 15,000 poise as measured at a shear rate of 1000/sec at a temperature of 40° C. higher than the temperature at which the aromatic polyester starts to show its anisotropy (a temperature for initiating liquid crystal), selected from three kinds of aromatic polyesters consisting of specific construction units and (B) 0.1-60 parts by weight of a copolymer consisting of $\alpha$-olefins and the glycidyl ester of $\alpha,\beta$-unsaturated acid (JP-A 8-311311 (see claim and paragraphs [0001], [0024] and [0048]).

JP-A 8-301983 discloses a blow molded container made of a liquid-crystalline polyester resin composition, containing (A) 56.0-99.0 wt % of liquid-crystalline polyester and (B) 44.0-1.0 wt % of an epoxy group-containing ethylene copolymer, (B) consisting of (a) 50.0-99.9 wt % of an ethylene unit, (b) 0.1-30.0 wt % of an unsaturated carboxylic acid glycidyl ester unit or an unsaturated glycidyl ether unit and (c) 0-49.9 wt % of an ethylene base unsaturated ester unit (JP-A 8-301983 (see claims 1 to 7).

JP-A 9-12744 discloses a liquid-crystalline polyester resin composition film obtained by tubular film extrusion molding a liquid-crystalline polyester resin composition containing (A) a liquid-crystalline polyester in the continuous phase and (B) a thermoplastic resin in the dispersed phase, wherein the liquid-crystalline polyester resin composition has a melt viscosity ratio (viscosity 2/viscosity 1) of 0.1 and 0.7, and has a flow beginning temperature (FT1) to satisfy FT1>FT2-10 in relation to the flow beginning temperature (FT2) of the liquid-crystalline polyester (A), wherein the flow beginning temperature (FT1) is defined as a temperature (° C.) at which the melt viscosity of a resin is 48,000 poises when the resin heated at a temperature-programmed rate of 4° C./min is extruded through an 1 mm inside-diametric and 10 mm long nozzle under a load of 100 kgf/cm$^2$; the viscosity 1 is a melt viscosity which the resin has when measured at a shear rate of 100/sec or 1000/sec at the flow beginning temperature; and the viscosity 2 is a melt viscosity which the resin has when measured at the same shear rate at a temperature of 20° C. higher than the flow beginning temperature.

However, all three technologies described above relate to aromatic polyester liquid crystalline resins, but give neither description nor suggestion about a wholly aromatic polyesteramide liquid crystalline resin.

DISCLOSURE OF THE INVENTION

A purpose of the present invention is to obtain an article by easy blow molding or easy extrusion molding to give a draw down resistance and a uniform wall thickness of the article without damaging a low gas permeability which is a characteristic property of a liquid-crystalline polymer.

The present inventors made a strenuous study, and have found that a wholly aromatic polyesteramide liquid crystal resin having a specific structure (A) and an epoxy-modified polyolefin resin (B) can be mixed and melt-kneaded to get a resin composition having a specific melt viscosity and a specific melt tension, which is then used to solve the problem mentioned above. This finding has completed the present invention.

That is, the first aspect of the present invention is to provide a resin composition for extrusion molding, prepared by mixing 99-70 wt. % of wholly aromatic polyester amide liquid crystal resin (A) having a melting point of 270-370° C. and a melt viscosity at 1000/sec. shear rate of 20-60 Pa·s at a temperature (as referred to Temperature T1) higher than 20° C. from said melting point, and having (I) to (V) repeating polymeric units as follows:
(I) 1-15 mole % of 6-hydroxy-2-naphthoic acid residue,
(II) 40-70 mole % of 4-hydroxybenzoic acid residue,
(III) 5-28.5 mole % of aromatic diol residue,
(IV) 1-20 mole % of 4-aminophenol residue, and
(V) 6-29.5 mole % of aromatic dicarboxylic acid residue
(wherein the aromatic diol residue and the aromatic dicarboxylic acid residue are divalent groups containing at least one aromatic ring); and
1-30 wt. % of epoxy modified polyolefin type resin (B) (the total of both is 100 wt. %), followed by melting and kneading thereof, wherein a melt viscosity at 1000/sec. shear rate of said resin composition at said Temperature T1 is 60-4000 Pa·s, and a melt tensile strength at 14.8 m/min. draw rate is 20 mN or more.

The second aspect of the present invention is to provide the resin composition for extrusion molding described in the first aspect of the present invention, which has:
(I) 6-15 mole % of 6-hydroxy-2-naphthoic acid residue,
(II) 40-70 mole % of 4-hydroxybenzoic acid residue,
(III) 5-28.5 mole % of aromatic diol residue,
(IV) 1-20 mole % of 4-aminophenol residue, and
(V) 6-29.5 mole % of aromatic dicarboxylic acid residue.

The third aspect of the present invention is to provide the resin composition for extrusion molding described in the first or second aspect of the present invention, wherein an increase ratio of a melt tensile strength at a two times draw rate (29.6 m/min.) to a melt tensile strength at 14.8 m/min. draw rate (as referred to a melt tensile strength increase rate) is 1.05 or more times.

The fourth aspect of the present invention is to provide the resin composition for extrusion molding described in any one of the first to third aspects of the present invention, wherein the extrusion molding is blow molding, tube molding, tubular film extrusion molding or profile extrusion molding.

The fifth aspect of the present invention is to provide an extrusion molded article prepared by extrusion of the resin composition for molding described in any one of the first to fourth aspects of the present invention.

The sixth aspect of the present invention is to provide the extrusion molded article described in the fifth aspect of the present invention, wherein the molded article is a hollow molded article.

The seventh aspect of the present invention is to provide the extrusion molded article described in the sixth aspect of the present invention, wherein the hollow molded article is a blow molded vessel, tubular film, liner, tube or pipe.

BEST MODE FOR CARRYING OUT THE INVENTION

Wholly Aromatic Polyesteramide Liquid-Crystalline Resin (A)

The wholly aromatic polyesteramide liquid crystal resin according to the present invention contains repeating polymer units of (I) to (V) as follows,
wherein the sum of repeating polymer units of (I) to (V) is 100 mole %; and the sum of hydroxyl residues and amino residues and the sum of carboxyl residues are equimolar to each other except for the end groups of the resin; and in particular, the sum of (III)+(IV) and (V) are equimolar to each other.

(I) 6-Hydroxy-2-naphthoic acid residue has the amount of 1-15 mole %, and preferably 6.0-15 mole %.

6-hydroxy-2-naphthoic acid residue has preferably 6.0-15 mole % from the viewpoint of the melt tension increase ratio and the maximum blow-up ratio in tubular film extrusion molding described below.

(II) 4-Hydroxybenzoic acid residue has 40-70 mole %, and preferably 50-65 mole %.

(III) Aromatic diol residue has 5-28.5 mole %, preferably 5-25 mole %, and more preferably 10-20 mole %. The aromatic diol residue is represented by the chemical formula (III) described below:

—O—Ar—O—         (III)

wherein Ar is a divalent group containing at least one aromatic ring.

(IV) 4-Aminophenol residue has 1-20 mole %, preferably 2-15 mole %, and more preferably 2.5-10 mole %.

(V) Aromatic dicarboxylic acid residue has 6-29.5 mole %, preferably 8-25 mole %, and more preferably 10-20 mole %. The aromatic dicarboxylic acid residue is represented by the chemical formula (V) described below:

—CO—Ar'—CO—         (V)

wherein Ar' is a divalent group containing at least one aromatic ring.

The aromatic diol residue and the aromatic dicarboxylic acid residue are divalent groups containing at least one aromatic ring, and the two or more aromatic rings may be linked to each others through methylene group, ethylene group, isopropylidene group, hexafluoroisopropylidene group, carbonyl group, sulfur atom, sulfone group, sulfoxide group, oxygen atom, alkylenedioxy group having a carbon number of 3 to 6 or the like. Preferably, they are one or more residues selected from 1,4-phenylene, 1,3-phenylene, 2,6-naphthalene and 4,4'-biphenylene.

Specifically, as a monomer imparting the aromatic diol residue, hydroquinone, resorcinol and 4,4'-dihydroxybiphenyl may be mentioned.

Specifically, as a monomer imparting the aromatic dicarboxylic acid residue, an aromatic dicarboxylic acid such as terephthalic acid, isophthalic acid, phthalic acid and 4,4'-diphenyldicarboxylic acid may be mentioned.

The polyesteramide, which has a polyester skeleton having hydroxybenzoic acid residue as the principal component with an amide bond partially introduced therein, is preferred to obtain a blow-molded article having a high mechanical strength to destruction. However, too many amide bonds are introduced to deteriorate hue and lower heat stability, thus the amide bond to introduce must be suppressed to have an amount of 20 mole % or below relative to all bond units.

The wholly aromatic polyesteramide having a specific resin composition described above can be used as a material to provide a blow-molded article and an extrusion-molded article having practically good physical properties.

The repeating polymer units of (I) to (V) described above are specifically produced using various material compounds capable of forming usual esters or amides. As material compounds required for forming the liquid-crystalline polyesteramide according to the present invention, 6-hydroxy-2-naphthoic acid, 4-hydroxybenzoic acid, an aromatic diol, 4-aminophenol and an aromatic dicarboxylic acid may be used in their respective intact forms or in their respective forms having the functional groups modified with various derivatives if it is necessary for the polycondensation reaction, for example, in their esters and amides, particularly, in their acetylated products such as 4-(N-acetylamino)phenol.

The amide bond in the present invention is formed using p-aminophenol and p-(N-acetylamino)phenol, and also may be derived from the following: p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxydiphenol, 4-amino-4'-hydroxydiphenyl ether, 4-amino-4'-hydroxydiphenylmethane, 4-amino-4'-hydroxydiphenylethane, 4-amino-4'-hydroxydiphenylsulfone, 4-amino-4'-hydroxydiphenylsulfide, 4,4'-diaminophenylsulfide (thiodianiline), 4,4'-diaminodiphenylsulfone, 2,5-diaminotoluene, 4,4'-ethylene dianiline, or 4,4'-diaminodiphenoxyethane, and 3,4'-diaminophenyl X, 3-amino-4'-hydroxyphenyl X and 3-hydroxy-4'-aminodiphenyl X (wherein X is selected from the group consisting of sulfide, sulfone, ether and methane).

The wholly aromatic polyesteramide liquid-crystalline resin according to the present invention can be obtained by polymerization using a direct polymerization method or a transesterification method. Usually, a solvent polymerization method, a melt polymerization method and a slurry polymerization method for example are used to polymerize. Various catalysts can be used in these polymerization methods, and typically, dialkyltin oxide, diaryltin oxide, titanium dioxide, alkoxytitanium silicates, titanium alcoholates, the alkaline and alkaline-earth metal salts of a carboxylic acid, and a Lewis acid salt such as boron trifluoride may be mentioned. The amount of catalyst for use is preferably 0.001-1 wt % relative to the total weight of monomer.

The liquid crystal resin according to the present invention is melt to show optical anisotropy. The anisotropy in a molten state can be confirmed by a usual polarization test using cross-polarizers.

Liquid crystallization provides the resin with excellent properties such as extremely low gas permeability, dimensional stability and chemical resistance.

The wholly aromatic polyesteramide (A) described above has a melting point of 270-370° C., and preferably 290-320° C. when measured by DSC, and has a melt viscosity of 20-60 Pa·s when measured at a shear rate of 1000/sec at a temperature of 20° C. higher than the melting point (temperature T1).

The liquid crystal resin, which has a melting point of lower than 270° C., provides the resin composition with a low mechanical properties, bringing a limit to its application in the field where a monolayer is demanded to have a certain strength, while the liquid crystal resin, which has a melting point of higher than 370° C., can not be melt-kneaded with a modified polyolefin to suppress a side reaction such as degradation at a high temperature, bringing a liquid crystal resin composition with insufficient quality.

Further, the liquid crystal resin, which has a melt viscosity of without the above range when measured at a shear rate of 1000/sec at the temperature T1, inhibits the dispersion of the modified polyolefin, leading to insufficient improvement in drawdown resistance and thickness uniformity for molding, thereby imparting negative effects on the mechanical strength and low gas permeability of a molded article.

Epoxy-Modified Polyolefin Resin (B)

The epoxy-modified polyolefin resin (B) according to the present invention is a copolymer containing α-olefin and the glycidyl ester of α,β-unsaturated acid as principal components.

As the α-olefin described above, ethylene, a copolymer of ethylene and α-olefin having a carbon number of 3 or more; and a copolymer of ethylene, α-olefin having a carbon number of 3 or more and a nonconjugated diene may be mentioned, and ethylene is preferably used.

As the α-olefin having a carbon number of 3 or more, propylene, butene-1, pentene-1, 3-methylpentene-1 and octene-1 may be mentioned, and among them, propylene and butene-1 are preferably used. The nonconjugated diene includes norbornene compounds such as 5-methylidene-2-norbornene, 5-ethylidene-2-norbornene, 5-vinyl-2-norbornene, 5-propenyl-2-norbornene, 5-isopropenyl-2-norbornene, 5-crotyl-2-norbornene, 5-(2-methyl-2-butenyl)-2-norbornene, 5-(2-ethyl-2-butenyl)-2-norbornene, 5-methacrylnorbornene or 5-methyl-5-vinylnorbornene, and dichloropentadiene, methyltetrahydroindene, 4,7,8,9-tetrahydroindene, 1,5-cyclooctadiene, 1,4-hexadiene, isoprene, 6-methyl-1,5-heptadiene and 11-ethyl-1,1,1-tridecadiene, and in particular, 5-methylidene-2-norbornene, 5-ethylidene-2-norbornene, dichloropentadiene and 1,4-hexadiene are preferably used.

As the glycidyl ester of the α,β-unsaturated acid described above, specifically glycidyl acrylate ester, glycidyl methacrylate ester (abbreviated as GMA) and glycidyl ethacrylate ester may be mentioned. Glycidyl methacrylate is preferably used. α-Olefins (for example, ethylene) and the glycidyl ester of α,β-unsaturated acid can be copolymerized by a well known radical polymerization reaction.

The epoxy-modified polyolefin resin (B) is preferably a copolymer of 99 to 50 mole % of α-olefin and 1 to 50 mole % of the glycidyl ester of α, β-unsaturated acid. Further, in the copolymerization step to the epoxy-modified polyolefin resin (B), copolymerizable unsaturated monomers including a vinyl ether; a vinyl ester such as vinyl acetate and vinyl propionate; the methyl, ethyl, or propyl ester of acrylic acid and other (meth) acrylic acid; acrylonitrile, and styrene may be added to copolymerize provided that they are add at an amount of 40 mole % or less.

Further, this epoxy-modified polyolefin resin (B) can be graft polymerized with a polymer or a copolymer as a branched or crosslinked chain.

As the polymer or the copolymer to graft polymerize as a branched or crosslinked chain, those produced by polymerizing or copolymerizing one or more compounds selected from acrylic acid, methacrylic acid, methyl acrylate, methyl methacrylate, butyl acrylate, butyl methacrylate, acrylonitrile and styrene may be mentioned. From the viewpoint of moldability, preferably, a methacrylic acid polymer, a copolymer of acrylonitrile and styrene, a copolymer of methyl methacrylate and butyl acrylate, and the like may preferably be mentioned. More preferable is a copolymer of methyl methacrylate and butyl acrylate.

These polymers and copolymers are prepared by a well known radical polymerization. Further, the branching or crosslinking reaction of these polymers and copolymers can also and easily be conducted by radical reaction. For example, a peroxide or the like is added to these polymers and copolymers to produce free radicals, which is then melt-kneaded with the copolymer between α-olefin and glycidyl ester of α,β-unsaturated acid to prepare the desired olefin resin (B). 100 parts by weight of the copolymer between α-olefin and glycidyl ester of α,β-unsaturated acid is preferably branched or crosslinked with 10 to 100 parts by weight of a branching or crosslinking chain.

Resin Composition for Extrusion-Molding

The resin composition for extrusion-molding of the present invention contains 99-70 wt %, preferably 95-80 wt %, of the liquid crystal resin of wholly aromatic polyesteramide (A) and 1-30 wt %, preferably 5-20 wt %, of the epoxy-modified polyolefin resin (B) described above.

The component (B), which is formulated at an amount of less than the range described above, can not sufficiently increase the melt viscosity and the melt tension of the resin composition, while the component, which is formulated at an amount of more than that range, lowers the thickness uniformity of the molded article.

The resin composition for extrusion-molding of the present invention is produced by melt-kneading the wholly aromatic polyesteramide liquid crystal resin (A) and the epoxy-modified polyolefin resin (B), and has a melt viscosity of 60-4000 Pa·s, preferably 80-1000 Pa·s when measured at a shear rate of 1000/sec at the temperature T1 described above, and has a melt tension of 20 mN or more, preferably 50-200 mN when measured at a draw speed of 14.8 m/min.

The resin composition, which has a melt viscosity and a melt tension of lower than their respective ranges described above, brings insufficient drawdown resistance, while the composition, which has those of higher than their respective ranges, brings lowered stretchability and thickness uniformity, and thus is inappropriate for extrusion molding such as blow molding and film molding.

Further, the resin composition has a melt tension increase ratio of 1.05 or higher, preferably 1.1-2.0 between a melt tension when measured at a draw speed of 14.8 m/min and that at the twofold draw speed, that is, at 29.6 m/min.

The resin composition, which has a melt tension increase of lower than the range described above, makes it difficult to perform extrusion molding such as blow molding and film molding.

The resin composition for extrusion molding of the present invention can be supplied, if needed, with a reinforcing agent such as glass fiber, carbon fiber and asbestos; an additive such as a filler, a core, a pigment, an antioxidant, a stabilizer, a plasticizer, a lubricant, a release agent and a flame retardant; and the other thermoplastic resin to furnish with a desired property.

1-50 wt %, preferably 10-30 wt % of the filler and/or the reinforcing agent is formulated relative to the total weight of the resin.

The typical filler includes calcium silicate, silica, clay, talc, mica, polytetrafluoroethylene, graphite, alumina trihydrate, aluminum-sodium carbonate, barium ferrite and wollastonite.

The typical reinforcing fiber includes glass, graphite carbon, amorphous carbon, synthesized polymer, alumina, aluminum silicate, aluminum oxide, titanium, magnesium, rock wool, steel, and tungsten fibers, or wollastonite fiber having an aspect ratio of 3:1 or more.

The method for producing the resin composition for extrusion molding of the present invention is not limited to in particular. The resin composition is produced by melt-kneading the wholly aromatic polyesteramide liquid crystal resin (A) and the epoxy-modified polyolefin resin (B). For example, an extruder is preferably used to melt-knead them.

When a general extruder is used, the temperature for melt-kneading is 270-380° C., preferably 280-360° C., and the melt-kneading duration is preferably 2-5 minutes.

The method for molding the resin composition for extrusion molding of the present invention is not limited in particular as far as it gives a molded article through a die, and includes a T-die film or sheet molding, a profile extrusion molding, a co-extrusion-molding, an extrusion laminate molding, a tubular film extrusion molding, a blow molding, a stretched-film molding, an extrusion compression molding, and an extrusion melt-foam molding. The blow molding is preferred, and for example, a direct blow molding, a sheet blow molding, a multilayer sheet blow molding, and a hot Parison method injection stretch blow molding may be mentioned.

The molded article using the resin composition for extrusion molding of the present invention is a hollow molded article, and the hollow molded article may further be processed into, for example, a film, a sheet, a plate, a tube, a pipe, a bottle, a fiber, a net, a liner (namely, a resin lining layer) and the like. A blow-molded article, a tube, a film, a sheet and the like are preferred.

The present invention can furnish a liquid-crystalline polymer with drawdown resistance and blow-mold or extrusion mold the liquid-crystalline polymer in a simple manner without the low gas permeability of the liquid-crystalline polymer impaired, thereby to provide a hollow molded article with uniformity in thickness. The hollow molded article is excellent in mechanical strength, dimensional stability and low gas permeability, and thus is suitable for container, pipe-like hollow parts and the like, and can be especially used for a liner for a gas tank or a fuel tank for an automobile.

EXAMPLES

The present invention will further be explained in detail below with reference to Examples, but the present invention will not be limited to them.

Now, methods for measuring physical properties in Examples are as follows.

(Melting Point and Glass Transition Temperature)

Differential scanning calorimetric apparatus (DSC7 from Perkin Elmer) was used to measure at a programmed temperature rate of 20° C./min. Melting point Tm of a liquid-crystalline is sometimes difficult to determine from a melt peak by DSC, thus the determination should be performed with the help of microscopic observation of the phase change under a crossed nicol.

(Liquid Crystallinity)

Samples were placed to melt on a hot stage from Linkam scientific Instrument Ltd. and observed at a magnification of ×150 under a nitrogen atmosphere using a polarizing microscope from Olympus Co. The sample was inserted between cross polarizers to transmit light, and a polarized light was transmitted to judge that it was optically anisotropic even when it was a stationary molten liquid.

(Melt Viscosity)

A capillary rheometer (Capillograph 1B: piston diameter 10 mm, from Toyo Seiki Seisaku-sho Ltd.) was used to determine an apparent melt viscosity according to ISO 11443 when a sample was sheared at a shear rate of 1000/sec at a temperature of T1 (the resin's melting point+20° C.). A 1 mm inside-diametric and 20 mm long orifice was used for measurement.

(Melt Tension)

The capillary rheometer described above was used to eject a molten polymer from the 1 mm inside-diametric and 20 mm long orifice at a temperature of T1 (the resin's melting point+ 20° C.) at a piston extrusion rate of 10 mm/min, and then the molten polymer was drawn into a filament at a draw speed of 14.8 and 29.6 m/min to determine the tensions (mN) applied to the filament.

(Blow Moldability (Existence of Rupture and Thickness Uniformity of Molded Article))

A cylindrical molded article having a diameter of 120 mm and a length of 280 mm was manufactured by a blow molding machine (S-45ND from Placo Co., Ltd.) wherein temperatures of the cylinder and the die of the molding machine were as shown in Tables 1 and 2, blow pressure was 7 kg/cm$^2$, and the die had an outside diameter of 50 mm and an inside-diameter of 48 mm. The molded article was visually inspected to evaluate about the existence of rupture. Then, the molded article was cross-sectioned at the centers of upper and lower parts to measure the minimum and the maximum in thickness, and the ratio between them was regarded as a value to evaluate about the thickness uniformity.

(Tubular Film Moldability (Maximum Blow-Up Ratio))

LABO-PLASTOMILL from Toyo Seiki Seisaku-sho Ltd. was mounted with a 25 mmφ die to manufacture a tubular film at the same temperature as in the blow moldability evaluation. The amount of ejected resin, the draw speed and the air volume of a blower were adjusted within a range to allow stable manufacturing the film, thereby to determine a maximum blow-up ratio, which was regarded as an indicator of the film moldability.

Manufacture Example 1

Polymerization of a Wholly Aromatic Polyesteramide Liquid Crystal Resin LCP (A1)

173 parts by weight (56 mole %) of p-hydroxybenzoic acid, 38 parts by weight (9 mole %) of 6-hydroxy-2-naphthoic acid, 52 parts by weight (12.5 mole %) of p,p'-dihydroxybiphenyl, 65 parts by weight (17.5 mole %) of terephthalic acid, 17 parts by weight (5 mole %) of 4-(N-acetamino)phenol, 0.04 part by weight of potassium acetate and 221 parts by weight of acetic anhydride were charged into a reactor equipped with a stirrer and an evaporator tube, followed by filling sufficiently with nitrogen. The reaction solution was heated to 150° C. under an atmospheric pressure to start stirring. It was stirred for 30 minutes at 150° C., and further heated gradually to distill off acetic acid as a byproduct. After the temperature reached 350° C., the pressure in the reactor was gradually reduced. The reaction solution was further stirred for an hour at a pressure of 5 torr to get a targeted stir torque, when a drain hole at the bottom of the reactor was opened to discharge a resin into a strand using a nitrogen pressure.

The discharged strand was palletized by a pelletizer. The wholly aromatic polyesteramide liquid crystalline resin thus obtained had a melting point of 300° C. and a melt viscosity of 36.8 Pa·s at 320° C.

Manufacture Example 2

Polymerization of a Wholly Aromatic Polyesteramide Liquid Crystalline Resin LCP (A2)

The same procedure was conducted as in Manufacture Example 1, except that 188 parts by weight (60 mole %) of p-hydroxybenzoic acid, 21 parts by weight (5 mole %) of 6-hydroxy-2-naphthoic acid, 53 parts by weight (12.5 mole %) of p,p'-dihydroxybiphenyl, 66 parts by weight (17.5 mole %) of terephthalic acid, 17 parts by weight (5 mole %) of 4-(N-acetamino)phenol, 0.04 part by weight of potassium acetate and 221 parts by weight of acetic anhydride were charged.

The wholly aromatic polyesteramide liquid crystalline resin thus obtained had a melting point of 340° C. and a melt viscosity of 24.0 Pa·s at 360° C.

Manufacture Example 3

Polymerization of a Wholly Aromatic Polyester Liquid Crystal Resin LCP (A3) for Comparison 345 parts by weight (73 mole %) of p-hydroxybenzoic acid, 175 parts by weight (27 mole %) of 6-hydroxy-2-naphthoic acid, 0.02 part by weight of potassium acetate, 350 parts by weight of acetic anhydride were charged into a reactor equipped with a stirrer and an evaporator tube respectively, followed by filling with nitrogen sufficiently. The reaction solution was heated to 150° C. under an atmospheric pressure to start stirring. It was stirred for 30 minutes at 150° C., and further heated gradually to distill off acetic acid as a byproduct. After the temperature reached 300° C., the pressure in the reactor was gradually reduced. The reaction solution was stirred for an hour at a pressure of 5 torr to get a targeted stir torque, when the drain hole at the bottom of the reactor was opened to discharge a resin into a strand using a nitrogen pressure. The discharged strand was palletized by a pelletizer. The wholly aromatic polyester liquid crystal resin had a melting point of 280° C. and a melt viscosity of 50.1 Pa·s at 300° C.

The followings were used as epoxy-modified polyolefin resin (B).

A4200: poly(methyl methacrylate) (PMMA) graft polymer of ethylene-GMA copolymer supplied by Nof Corporation.

Bondfast 2C: ethylene-GMA copolymer containing 6 wt % of GMA, MFR3, supplied by Sumitomo Chemical Co., Ltd.

Bondfast E: ethylene-GMA copolymer containing 12 wt % of GMA, MFR3, supplied by Sumitomo Chemical Co., Ltd.

Examples 1 to 9

Liquid-crystalline resin LCP (A1) or (A2) produced as described above and various modified polyolefin resins (B) were dry-blended at their respective rates shown in Table 1, then the blend was melt-kneaded using a twin extruder (Tex30α from The Japan Steel Works, LTD.) at a cylinder temperature of (320° C. for LCP (A1) and 360° C. for LCP (A2)), at a throughput rate of 30 kg/hr and at a rotation speed of 200 rpm, and then pelletized to evaluate the blow moldability and the tubular film moldability. The results are shown in Table 1.

TABLE 1

| Component | | Examples | | | | | | | | |
|---|---|---|---|---|---|---|---|---|---|---|
| | | 1 | 2 | 3 | 4 | 5 | 6 | 7 | 8 | 9 |
| A | LCP (A1) | 85 | 90 | 85 | 95 | 92 | 90 | 88 | 85 | |
| | LCP (A2) | | | | | | | | | 90 |
| B | A4200 | 15 | | | | | | | | |
| | Bondfast 2C | | 10 | 15 | | | | | | |
| | Bondfast E | | | | 5 | 8 | 10 | 12 | 15 | 10 |
| | Composition MV (Pa·s) | 273.0 | 196.0 | 319.1 | 119.4 | 177.0 | 299.0 | 415.0 | 312.5 | 232.0 |
| | Melt tension (mN) at draw ratio 14.8 m/min | 74.4 | 75.2 | 120.2 | 53.2 | 57.6 | 134.9 | 199.0 | 102.0 | 92.0 |
| | Melt tension (mN) at draw ratio 29.6 m/min | 83.3 | 89.6 | 158.9 | 60.3 | 66.1 | 166.1 | 243.0 | 122.5 | 99.8 |
| | Melt tension increase rate | 1.12 | 1.19 | 1.32 | 1.13 | 1.15 | 1.23 | 1.22 | 1.20 | 1.08 |

TABLE 1-continued

| Component | Examples | | | | | | | | |
|---|---|---|---|---|---|---|---|---|---|
| | 1 | 2 | 3 | 4 | 5 | 6 | 7 | 8 | 9 |
| Temperatures of cylinder and die of the blow molding machine (?C.) | 310 | 310 | 310 | 320 | 320 | 310 | 310 | 310 | 350 |
| Blow moldability (thickness ununiformity) | ○ | ○ | ○ | ○ | ○ | ○ | ○ | ○ | ○ |
| Maximum thickness mm/ minimum thickness mm | 1.3/ 1.0 | 1.2/ 1.0 | 1.3/ 1.0 | 1.2/ 1.0 | 1.1/ 0.9 | 1.3/ 1.1 | 1.2/ 0.9 | 1.3/ 1.0 | 1.4/ 0.9 |
| Tubular film moldability | ○ | ○ | ○ | ○ | ○ | ○ | ○ | ○ | ○ |
| Maximum blow-up ratio | ≧4.8 | ≧4.8 | ≧4.8 | ≧4.8 | ≧4.8 | ≧4.8 | ≧4.8 | ≧4.8 | 3.5 |

Comparative Examples 1 to 5

The same procedure was conducted as in Example 1, except that liquid-crystalline resin LCP (A3) and various modified polyolefin resins were dry-blended at their respective rates shown in Table 2, and then the blend was melt-knead using the twin extruder described above at a cylinder temperature at 300° C. The blow moldability and the tubular film moldability were evaluated. The results are shown in Table 2.

TABLE 2

| | | Comparative Examples | | | | |
|---|---|---|---|---|---|---|
| Component | | 1 | 2 | 3 | 4 | 5 |
| A | LCP (A3) | 95 | 85 | 90 | 85 | 90 |
| B | A4200 | 5 | 15 | | | |
| | Bondfast 2C | | | 10 | 15 | |
| | Bondfast E | | | | | 10 |
| Composition MV (Pa·s) | | 128.4 | 314.8 | 187.7 | 317.1 | 285.6 |
| Melt tension (mN) at draw ratio 14.8 m/min | | 131.0 | 153.3 | 78.8 | 163.2 | 141.1 |
| Melt tension (mN) at draw ratio 29.6 m/min | | 134.6 | 152.9 | 81.0 | 163.9 | 140.8 |
| Melt tension increase rate | | 1.03 | 1.00 | 1.03 | 1.00 | 1.00 |
| Temperatures of cylinder and die of the blow molding machine (° C.) | | 300 | 300 | 300 | 300 | 300 |
| Blow moldability (thickness ununiformity) | | x | x | x | x | x |
| Maximum thickness mm/minimum thickness mm | | 2.1/ 0 (rupture) | 1.3/ 0.4 | 2.4/ 0 (rupture) | 1.6/ 0.6 | 1.1/ 0.4 |
| Tubular film moldability | | x | x | x | x | x |
| Maximum blow-up ratio | | 1.8 | 2.6 | 1.8 | 2.6 | 2.4 |

The invention claimed is:

1. A resin composition for extrusion molding, prepared by mixing 99-70 wt. % of wholly aromatic polyester amide liquid crystal resin (A) having a melting point of 270-370° C. and a melt viscosity at 1000/sec. shear rate of 20-60 Pa·s at a temperature (as referred to Temperature T1) higher than 20° C. from said melting point, and comprising (I) to (V) repeating polymeric units as follows:
    (I) 1-15 mole % of 6-hydroxy-2-naphthoic acid residue,
    (II) 40-70 mole % of 4-hydroxybenzoic acid residue,
    (III) 5-28.5 mole % of aromatic diol residue,
    (IV) 1-20 mole % of 4-aminophenol residue, and
    (V) 6-29.5 mole % of aromatic dicarboxylic acid residue
    (wherein the aromatic diol residue and the aromatic dicarboxylic acid residue are divalent groups containing at least one aromatic ring); and
1-30 wt. % of epoxy modified polyolefin type resin (B) (the total of both is 100 wt. %), followed by melting and kneading thereof, wherein a melt viscosity at 1000/sec. shear rate of said resin composition at said Temperature T1 is 60-4000 Pa·s, and a melt tensile strength at 14.8 m/min. draw rate is 20 mN or more.

2. The resin composition for extrusion molding according to claim 1, which comprises:
    (I) 6-15 mole % of 6-hydroxy-2-naphthoic acid residue,
    (II) 40-70 mole % of 4-hydroxybenzoic acid residue,
    (III) 5-28.5 mole % of aromatic diol residue,
    (IV) 1-20 mole of 4-aminophenol residue, and
    (V) 6-29.5 mole % of aromatic dicarboxylic acid residue.

3. The resin composition for extrusion molding according to claim 1, wherein an increase ratio of a melt tensile strength at a two times draw rate (29.6 m/min.) to a melt tensile strength at 14.8 m/min. draw rate (as referred to a melt tensile strength increase rate) is 1.05 or more times.

4. The resin composition for extrusion molding according to claim 1, wherein the extrusion molding is blow molding, tube molding, tubular film extrusion molding or profile extrusion molding.

5. An extrusion molded article, prepared by extruding the resin composition for molding according to any claim 1.

6. The extrusion molded article according to claim 5, wherein the molded article is a hollow molded article.

7. The extrusion molded article according to claim 6, wherein the hollow molded article is a blow molded vessel, tubular film, liner, tube or pipe.

* * * * *